United States Patent
Toosky et al.

(10) Patent No.: US 9,099,922 B2
(45) Date of Patent: Aug. 4, 2015

(54) SYSTEM AND METHOD FOR ADAPTIVE CURRENT LIMIT OF A SWITCHING REGULATOR

(71) Applicant: Touchstone Semiconductor, Inc., Milpitas, CA (US)

(72) Inventors: Zabih Toosky, Santa Cruz, CA (US); Martin Tomasz, Berkeley, CA (US)

(73) Assignee: SILICON LABORATORIES INC., Austin, TX (US)

( * ) Notice: Subject to any disclaimer, the term of this patent is extended or adjusted under 35 U.S.C. 154(b) by 249 days.

(21) Appl. No.: 13/725,890

(22) Filed: Dec. 21, 2012

(65) Prior Publication Data

US 2014/0176106 A1    Jun. 26, 2014

(51) Int. Cl.
G05F 1/563 (2006.01)
H02M 3/158 (2006.01)
H02M 1/00 (2007.01)

(52) U.S. Cl.
CPC ...... H02M 3/158 (2013.01); *H02M 2001/0025* (2013.01); *H02M 2001/0032* (2013.01); *Y02B 70/16* (2013.01)

(58) Field of Classification Search
USPC ................................................ 323/280–290
See application file for complete search history.

(56) References Cited

U.S. PATENT DOCUMENTS

| | | | | |
|---|---|---|---|---|
| 6,486,645 | B1 * | 11/2002 | Van Auken | 323/287 |
| 7,030,596 | B1 * | 4/2006 | Salerno et al. | 323/282 |
| 7,084,612 | B2 * | 8/2006 | Zinn | 323/266 |
| 7,471,527 | B2 * | 12/2008 | Chen | 363/65 |
| 7,616,459 | B2 * | 11/2009 | Huynh et al. | 363/21.12 |
| 8,102,679 | B2 * | 1/2012 | Gong et al. | 363/21.12 |
| 2007/0133234 | A1 * | 6/2007 | Huynh et al. | 363/20 |
| 2014/0218106 | A1 * | 8/2014 | Drogi et al. | 330/129 |

* cited by examiner

*Primary Examiner* — Adolf Berhane
*Assistant Examiner* — Nusrat Quddus
(74) *Attorney, Agent, or Firm* — Gary Stanford

(57) ABSTRACT

An adaptive current limiter including a conversion network and an amplifier network developing an adaptive current limit signal for use by a switching regulator to limit peak current through an inductor of the switching regulator. The switching regulator develops a pulse control signal for controlling switching of current through the inductor to convert an input voltage to an output voltage. The conversion network provides a limit value by applying a duty cycle of the pulse control signal to a reference value. The amplifier network is configured to develop the adaptive current limit signal based on the limit value. The conversion network may multiply the reference value by the duty cycle to develop the limit value. The amplifier network may include a current source providing a fixed reference current to an amplifier to establish a minimum level of the adaptive current limit signal.

21 Claims, 5 Drawing Sheets

108

SYSTEM AND METHOD FOR ADAPTIVE CURRENT LIMIT OF A SWITCHING REGULATOR

BACKGROUND OF THE INVENTION

1. Field of the Invention

The present invention relates in general to DC-DC switching regulators, and more particularly to a system and method for adaptive current limit setting of a switching regulator to improve efficiency at lower load levels.

2. Description of the Related Art

A DC (direct current) to DC switching regulator converts an unregulated input DC voltage to a regulated output voltage or otherwise converts voltage from one voltage level to another. A switching regulator typically includes an inductor, a capacitor, a switch network (including at least one switch), a rectifier or rectifying element, a feedback network and a modulator. The modulator monitors one or more sense signals via the feedback network and adjusts a pulse control signal used to control the switch network. The switch network switches voltage applied across the inductor which is used as a storage device to transfer energy from the input voltage to an output voltage stored on the capacitor.

The feedback network is configured to sense various parameters of operation depending upon the particular configuration to develop and provide the sense signals to the modulator for purposes of control. For example, the parameters typically include the output voltage in which the modulator adjusts the pulse control signal to maintain the output voltage within a regulation voltage range above and below a target or desired nominal voltage level VNOM. The pulse control signal may be implemented as a pulse width modulation (PWM) signal in which the modulator adjusts the duty cycle of the PWM signal.

Another parameter that may be monitored by the feedback network is the peak current level of current through the inductor. In a boost converter, for example, a switch is turned on to apply the input voltage across the inductor to cause inductor current to increase to store energy in the inductor. When the current reaches a peak level, the switch is turned off and the stored energy in the inductor tends to collapse and the voltage polarity changes such that it adds to the input voltage. The rectifying element coupled between the inductor and the output turns on to charge the output voltage until the current decreases to zero or some other predetermined level. The cycle then repeats during normal operation.

Power consumption and efficiency is of utmost importance in portable and/or battery-powered applications or in energy monitoring or conversion devices (e.g., used for solar energy applications or the like). The switching regulator is used to convert the voltage level of an input voltage of a battery or a monitoring device or a conversion device or the like to a regulated output voltage useful for electronic devices or measurement devices and the like. The conversion efficiency of the switching regulator is an important aspect of the power consumption and efficiency of the overall system.

SUMMARY OF INVENTION

An adaptive current limiter according to one embodiment includes a conversion network and an amplifier network developing an adaptive current limit signal for use by a switching regulator to limit peak current through an inductor of the switching regulator. The switching regulator develops a pulse control signal for controlling switching of current through the inductor to convert an input voltage to an output voltage. The conversion network is configured to provide a limit value based on applying a duty cycle of the pulse control signal to a reference value. The amplifier network is configured to develop the adaptive current limit signal based on the limit value. The conversion network may be implemented to multiply the reference value by the duty cycle to develop the limit value. The amplifier network may include a current source providing a fixed reference current to an amplifier to establish a minimum level of the adaptive current limit signal.

A switching regulator according to one embodiment includes a switch network a current sense network, a voltage sense network, first and second comparators, a modulator, and an adaptive current limiter. The switch network is configured to switch current through an output inductor using a pulse control signal to convert an input voltage to an output voltage. The current sense network is configured to develop a current sense signal indicative of current through the inductor. The voltage sense network is configured to develop a voltage sense signal indicative of the output voltage. The first comparator compares the current sense signal with an adaptive current limit signal to develop a first timing signal. The second comparator compared the voltage sense signal with a predetermined nominal value to develop a second timing signal. The modulator is configured to develop the pulse control signal using the timing signals. The adaptive current limiter provides the adaptive current limit signal proportional to a duty cycle of the pulse control signal indicative of an output load of the switching regulator.

A method of adaptively adjusting peak current through an inductor of a switching regulator is described. The switching regulator develops a pulse control signal to control switching of current through the inductor to convert an input voltage to an output voltage. The method includes applying the pulse control signal to a reference value to provide a limit value proportionate to output load, and developing an adaptive current limit signal based on the limit value for use by the switching regulator to limit peak current through the inductor.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is a block diagram illustrating the switching regulator of FIG. 1 configured in an alternative configuration, such as incorporated on an integrated circuit (IC) or the like;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A switching regulator as described herein develops a pulse control signal to control a switch network (one or more switches) to control current through an inductor to convert an input voltage to an output voltage. In one embodiment, the inductor charges during a first cycle portion and discharges during a second cycle portion to charge an output capacitor. In one embodiment, the switching regulator includes a modulator which develops the pulse control signal to operate the switching regulator in a discontinuous conduction mode (DCM) while regulating the output voltage to a predetermined level. The switching regulator includes an adaptive current limiter which limits the maximum or peak current level in the inductor. The adaptive current limiter increases the current limit to service higher load levels, and decreases the current limit at lower load levels to improve overall efficiency. In one embodiment, the adaptive current limiter includes a conversion network and an amplifier network. The conversion network is configured to provide a limit value based on applying a duty cycle of the pulse control signal to a reference value. The amplifier network is configured to provide an adaptive current limit signal based on the limit value, in which adaptive current limit signal is configured to be used by the switching regulator to limit peak current through the inductor.

Figure 1:
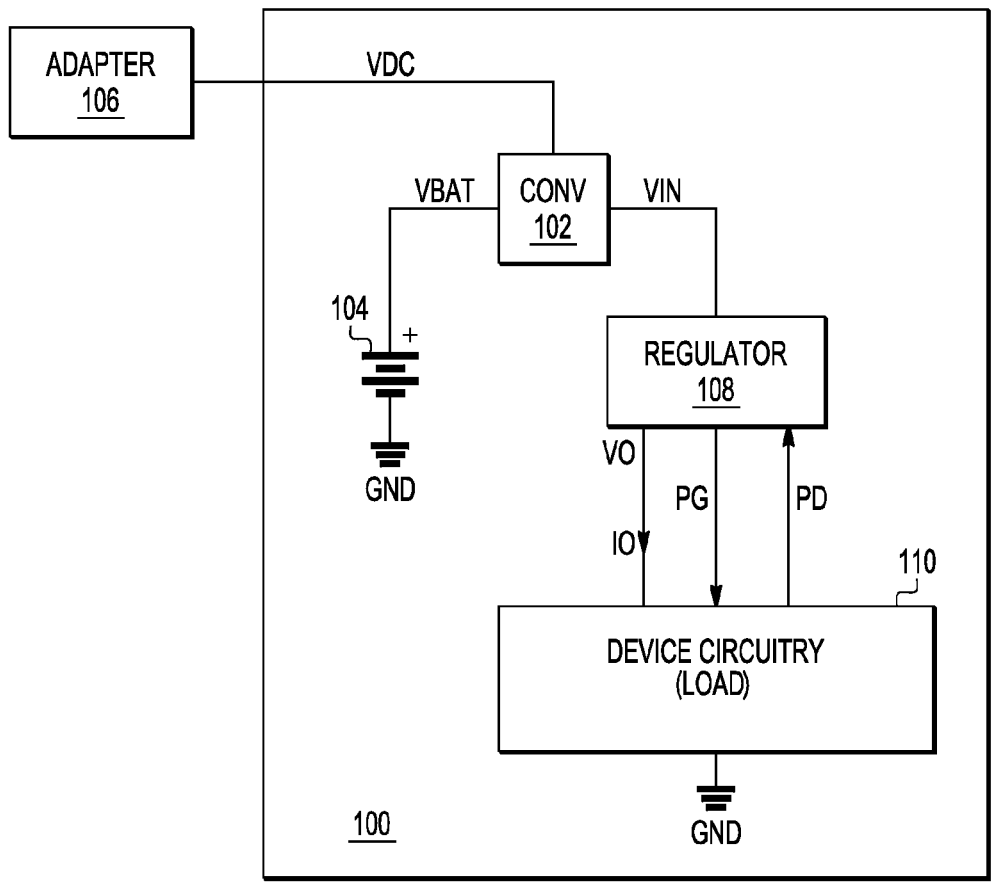
FIG. 1 is a block diagram of an electronic device including a DC-DC switching regulator implemented according to one embodiment for providing a regulated output voltage.

FIG. 1 is a block diagram of an electronic device 100 including a DC-DC switching regulator 108 implemented according to one embodiment for providing a regulated output voltage VO. The electronic device 100 is shown including a battery 104 providing a battery voltage VBAT to one input of a converter (CONV) circuit 102, having another input receiving a DC voltage (VDC) from a power adapter 106. The power adapter 106 receives AC or DC voltage from an external power source, such as an alternating current (AC) source (not shown), and converts the received voltage to the VDC voltage. The power adapter 106 is shown as an external device, but may also be configured within the body of the electronic device 100. The converter 102 receives VDC and/or VBAT and provides an input voltage VIN to an input of the switching regulator 108. The switching regulator 108 has an output providing the output voltage VO, which is used to provide source voltage to device circuitry 110 of the electronic device 100. The device circuitry 110 is considered the load of the switching regulator 108.

The converter 102 may perform a switching function for sensing whether VDC is available for determining the source of VIN. If the battery 104 is rechargeable, then the power adapter 106 and/or the converter 102 may include a battery charger for charging the battery 104 or a separate battery charger (not shown) may be included.

The device circuitry 110 generally includes the circuitry of the electronic device 100, which receives a load current IO. The device circuitry 110 may be configured according to any type of processing device, such as, for a non-exhaustive list of possible devices, a processor, a memory, and one or more other support device(s) coupled together via an appropriate interface, such as a bus or the like. Each of the devices receive a supply voltage from the switching regulator 108 (e.g., VO) relative to a reference source voltage level, such as GND. The reference source voltage level may have any suitable positive, negative or ground voltage level. Other types of electronic devices that do not have a processor or memory are also contemplated.

The electronic device 100 may be any type of electronic device, including mobile, portable, or handheld devices, such as, for example, any type of personal digital assistant (PDA), personal computer (PC), portable computer, laptop computer, etc., cellular phone, personal media device, etc. In an alternative embodiment, the electronic device 100 is not battery-powered and is powered by an AC source or other source of power. In general, the switching regulator 108 is configured as a power regulator for computer, industrial, consumer, etc., applications and/or battery-powered applications. The primary functions of the electronic device 100 are performed by the device circuitry 110 which is the device circuitry in the illustrated configuration. In one embodiment the battery 104 is a rechargeable battery of any suitable type, although non-rechargeable batteries are contemplated.

In various embodiments the voltage of VIN is below VO for a boost configuration, VIN is above VO for a buck configuration, or VIN relative to VO may range anywhere between for various other configurations, such as, for example, a single-ended, primary-inductor converter (SEPIC) or buck-boost converts or the like. The switching regulator 108 may further provide a power good (PG) signal to the device circuitry 110 after power up when it has achieved regulation. The device circuitry 110 may provide a power down (PD) signal to power down the switching regulator 108.

Figure 2:
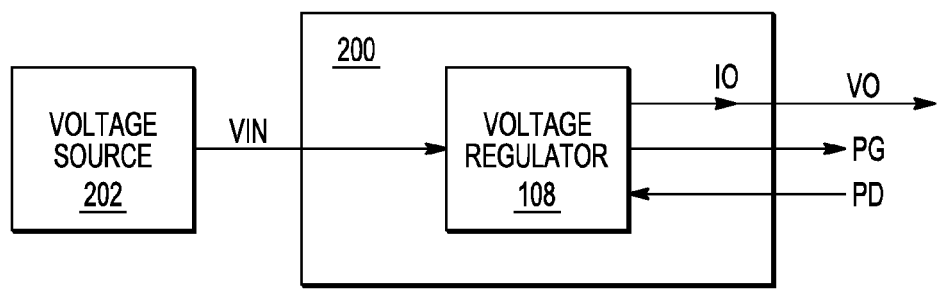

FIG. 2 is a block diagram illustrating the switching regulator 108 configured in an alternative configuration, such as incorporated on an integrated circuit (IC) 200 or the like. In this case, the input voltage VIN is provided from an external voltage source 202 coupled through a pin of the IC 200, and the output voltage VO is provided externally via another pin or the like. The external voltage source 202 may be any type of energy harvesting device or system that develops an output voltage which varies or which is relatively unregulated, such as a solar cell or a measurement monitoring device the like. The switching regulator 108 is operative to convert the output voltage of the voltage source 202 into the regulated output voltage VO. The output voltage may range from less than to greater than the input voltage depending upon the particular implementation. The load current IO is provided at the output of the IC 200 for providing voltage to another external device (not shown).

The switching regulator 108 further provides the PG signal after power up when it has achieved regulation. The PG signal may be used by an external device to determined when VO has reached regulation voltage level and/or other functions, such as a wakeup notification for a processing device (e.g., microprocessor or microcontroller or the like) of the external device. The PD signal may be provided by the external device to power down the switching regulator 108.

Figure 3:
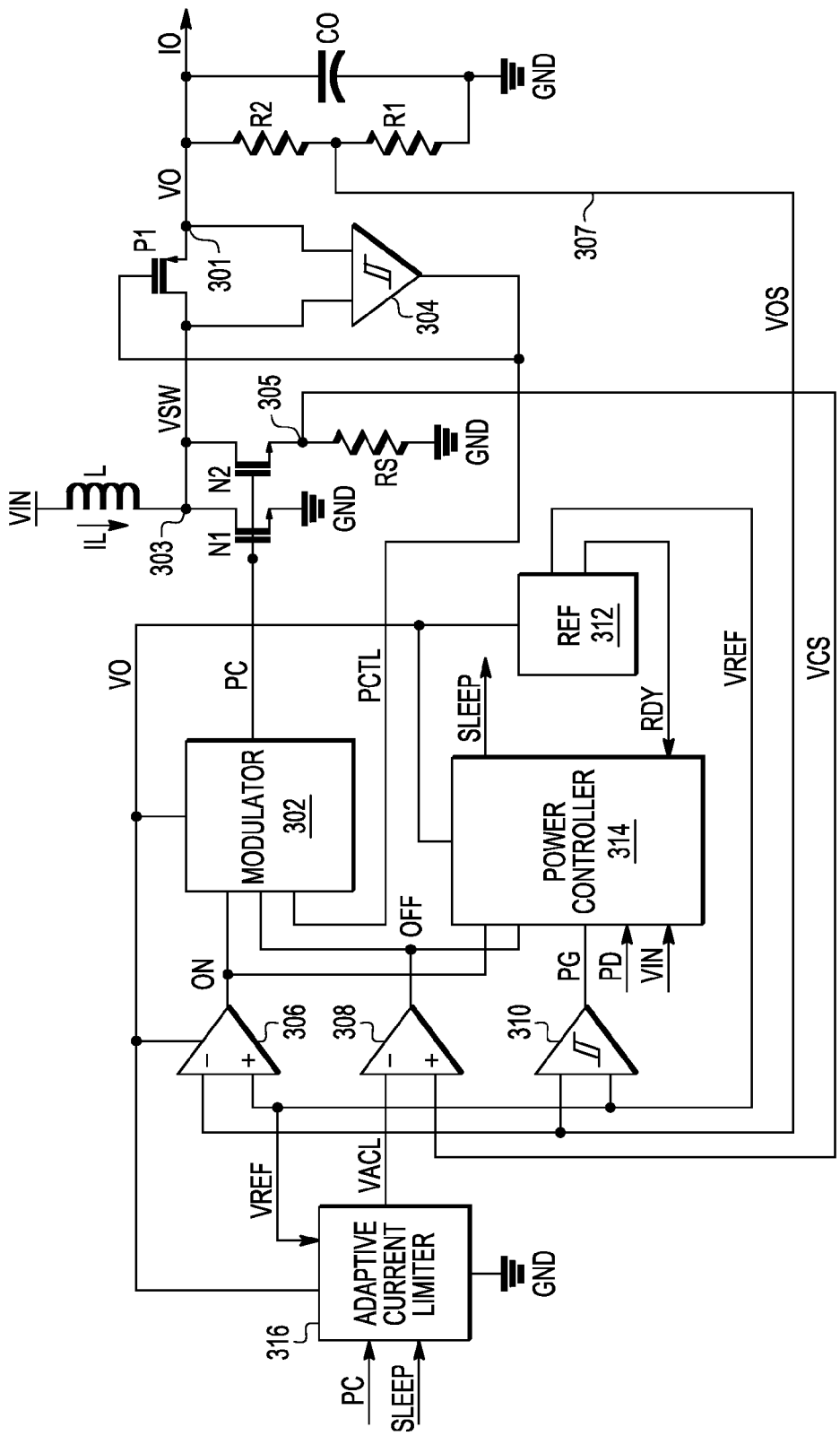
FIG. 3 is a schematic and block diagram of the switching regulator of FIG. 1 including an adaptive current limiter implemented according to an exemplary embodiment of the present invention.

FIG. 3 is a schematic and block diagram of the DC-DC switching regulator 108 including an adaptive current limiter 316 implemented according to an exemplary embodiment of the present invention. During normal operation, a modulator 302 develops a pulse control (PC) signal which is provided to the gates of a pair of N-type metal-oxide semiconductor (NMOS) transistors N1 and N2. The PC signal may be implemented as a pulse width modulation (PWM) signal as understood by those of ordinary skill in the art. N1 and N2 each have a drain coupled to a switched node 303 (developing a switch voltage VSW). The source of N1 is coupled to a reference node, such as ground (GND) and the source of N2 is coupled to a current sense node 305 which is further coupled to one end of a sense resistor RS. The other end of RS is coupled to GND and the current sense node 305 develops a current sense voltage VCS. An inductor L has one end coupled to an input node receiving the input voltage VIN and has its other end coupled to node 303. The sense resistor RS and N2 form a current sense network for sensing current through the inductor L, although alternative current sensing means are contemplated.

The N-type or P-type transistors shown and described herein are used as electronic switches which may be of any suitable type, such as a metal-oxide semiconductor (MOS) transistor, a field-effect transistor (FET) or the like, a MOSFET, a bipolar junction transistor (BJT) or the like, an insulated-gate bipolar transistor (IGBTs) or the like, etc. The type of the transistor indicates one of different conductivity types, such as an N-type or a P-type.

A P-type transistor P1 has its drain coupled to node 303, its source coupled to an output node 301 developing the output voltage VO, and its gate receiving an activation control voltage PCTL. A comparator 304 has a first input coupled to the drain of P1, a second input coupled to the source of P1, and has an output developing PCTL which is provided to the gate of P1 and to an input of the modulator 302. An output capacitor CO is coupled between the output node 301 and GND. A pair of resistors R1 and R2 are coupled in series between the output node 301 and GND forming an intermediate node 307 developing an output voltage sense voltage VOS. As shown, R2 is coupled between nodes 301 and 307 and R1 is coupled between node 307 and GND. The resistors R1 and R2 have resistive values such that when VO falls to a predetermined minimum voltage level VMIN, VOS falls to the voltage level of a reference voltage VREF. R1 and R2 form a voltage sense network for sensing the voltage level of VO, although alternative voltage sensing methods are contemplated.

VOS is provided to a negative (or inverting) input of a comparator 306, which receives the reference voltage VREF at its positive (or non-inverting) input. VREF is used by the comparator 306 as a matter of convenience, although any other suitable value may be used to represent the nominal voltage level of VO, in which the resistances of R1 and R2 are adjusted accordingly. The comparator 306 asserts a signal ON to an input of the modulator 302. VCS is provided to a negative input of a comparator 308, which receives an adaptive current limit voltage VACL at its positive (or non-inverting) input. The comparator 308 asserts a signal OFF to another input of the modulator 302. The comparators 306 and 308 are the primary comparators used during the normal operating mode for developing the PC signal. The ON and OFF signals may be considered timing signals for determining the transitions of the PC signal.

Operation of the switching regulator 108 is now briefly described. When the voltage of VO reaches or otherwise falls below VMIN, VOS falls to or below VREF and the comparator 306 asserts the ON signal. The modulator 302 responds by asserting the PC signal high to turn on N1 and N2. N1 is the primary switching device and when turned on, causes inductor current IL to flow from the input voltage VIN through the inductor L. N1 is substantially larger than N2 (e.g., has a much larger width to length ratio W/L) and may be implemented by multiple N-type transistors coupled in parallel. In one very specific embodiment, only for example, the ON resistance RON of N1 may be about 50 milliohms (mΩ) whereas the resistance of RS may be about 1 kilohm (kΩ). As the IL current quickly rises through inductor L, a small fraction of the current flows through the sense resistor RS causing the current sense voltage VCS to rise proportionately. When VCS reaches or otherwise exceeds the voltage of VACL, the comparator 308 asserts OFF high. The modulator 302 responds by asserting the PC signal back low turning off N1 and N2.

When N1 is turned off, the stored energy in the inductor L tends to collapse and its voltage polarity reverses so that its voltage is added to the voltage level of VIN causing the voltage level of VSW to increase. In this case, the switching regulator 108 is implemented as a boost converter in which VO is greater than VIN. When VSW reaches or exceeds the voltage level of VO, which occurs relatively soon after N1 is turned off, the comparator 304 pulls PCTL low to turn on P1 which allows the inductor current IL to flow to the output capacitor CO. The inductor current IL decreases and the voltage of VSW eventually begins to decrease and the comparator 304 turns P1 off for the rest of the cycle.

In one embodiment, the rectifier function performed by P1 stops conducting current when the inductor L is discharged to a value determined by a systematic offset voltage of the comparator 304. The systematic offset is configured or otherwise designed to override the otherwise random offset of the comparator 304 to ensure that current does not flow from node 301 to node 303. Thus, P1 is turned off about when the current through P1 from node 303 to node 301 drops to zero and before it reverses. P1 and the comparator 304 collectively perform the rectifier function or operate as a rectifying element or rectifier and may be replaced by a diode or the like, such as a Zener diode or Schottkey diode the like. N1, P1 and the comparator 304 may collectively be considered a switch network that is configured to switch current through the inductor L as controlled by the modulator 302 via the PC signal.

Operation repeats in this manner for subsequent cycles. In this case, the inductor L is allowed to discharge completely (so that its current goes to zero) before the end of each full cycle, so that the switching regulator 108 operates as a boost converter in discontinuous mode.

A reference (REF) block 312 provides VREF at a predetermined reference voltage level. In one embodiment, the REF block 312 incorporates bandgap circuitry or the like for developing VREF as a bandgap voltage reference. In one embodiment, VREF is approximately 500 millivolts (mV) although any suitable voltage level is contemplated for various configurations. In the embodiment illustrated, the reference block 312 and the modulator 302 both receive VO as source voltage. In one embodiment, VIN is in the range of about 1V and VO is about 3V, although alternative configurations and voltage levels are possible and contemplated.

A hysteretic comparator 310 receives VOS and VREF at respective inputs and develops the power good signal PG at its output which is provided to a power controller 314, which also receives the ON and OFF signals. In one embodiment, PG is asserted high when VOS indicates that VO is at or above a minimum regulation voltage level. In one embodiment, the minimum regulation voltage level is a certain percentage of a nominal operating voltage level VNOM, such as about 90% of VNOM or the like.

The power controller 314 performs various administrative and power saving functions. In one embodiment, for example, the power controller 314 receives VIN which is provided to a startup circuit or the like (not shown) which develops a rising voltage level of VO during startup. When VO reaches a certain level, the REF block 312 establishes the appropriate voltage level of VREF and asserts a ready signal RDY to the power controller 314. The power controller 314 responds by activating or otherwise enabling other portions of the switching regulator 108 to begin regulation operation for regulating VO. The power down signal PD may also be provided to the power controller 314, which when asserted, causes the power controller 314 to initiate a power down or shut down process to turn off the switching regulator 108.

The power controller 314 may also operate to reduce power dissipation by invoking a sleep mode by turning on and off certain devices and/or blocks when not needed. In one embodiment, the power controller 314 asserts a SLEEP signal to enter a sleep mode to turn off portions of the switching regulator 108 to conserve energy. For example, analog devices including amplifiers and switches and the like may be turned off or disabled to conserve power. In one embodiment, the power controller 314 includes a timer or the like (not shown) which triggers the sleep mode during normal operation by asserting the SLEEP signal. During sleep mode, the power controller 314 monitors one or more parameters that indicate that normal mode should be entered. In one embodiment, when the ON signal from the comparator 306 goes back high, the power controller 314 negates the SLEEP signal and returns the switching regulator to the normal mode.

While the inductor L is charging, a peak level of the inductor current, $IL_{PEAK}$, may be determined according to the following equation (1):

$$IL_{PEAK} = \frac{VIN \cdot D \cdot T}{L} \quad (1)$$

where D is the duty cycle of the PC signal, T is the total cycle time, DT is the portion of the cycle when N1 is on when the inductor current IL is increasing, and L is used to denote the inductance of the inductor L. During the off period, the inductor current IL falls to zero flowing to the output capacitor CO through P1 after a portion of the cycle time δT, as indicated by the following equation (2)

$$IL_{PEAK} + \frac{(VIN - VO)}{L}\delta T = 0 \quad (2)$$

where δ is according to the following equation (3):

$$\delta = \frac{VIN \cdot D}{VO - VIN} \quad (3)$$

The load current IO is the average of the rectifier current ID through P1 and the rectifier current is equal to the inductor current IL during the off state as shown by the following equation (4):

$$IO = ID_{AVG} = \frac{IL_{PEAK}}{2}\delta \quad (4)$$

Substituting for $IL_{PEAK}$ and δ into equation (4) yields the following equation (5):

$$IO = \frac{VIN^2 D^2 T}{2L(VO - VIN)} \quad (5)$$

The output voltage transfer ratio is according to the following equation (6):

$$\frac{VO}{VIN} = 1 + \frac{VIN \cdot D^2 T}{2L \cdot IO} \quad (6)$$

The efficiency ε of the switching regulator 108 during the normal operation mode is defined as the ratio of the output power PO to the input power PI according to the following equation (7):

$$\varepsilon = \frac{PO}{PI} = \frac{VO \cdot IO}{VI \cdot II} \quad (7)$$

where II is the input current. The efficiency ε is always less than 1 due to losses in a practical system. Losses in a converter or regulator, including the switching regulator 108, are usually due to non-zero resistances in the current path such as finite ON resistance of the MOSFET switch, equivalent series resistance (ESR) of the inductor L, plus any other parasitic resistances such as metal interconnection resistances on chip and/or trace resistance on a printed circuit board. These resistive elements are collectively referred to as a resistance $R_{LOSS}$. The power loss $P_{LOSS}$ caused by $R_{LOSS}$ is according to the following equation (8):

$$P_{LOSS} = R_{LOSS} \cdot IL_{PEAK}^2 \quad (8)$$

As equation (4) indicates, load current is proportional to inductor peak current and in order for the regulator to serve a larger load current, the inductor peak current should be high enough to accommodate the larger load. When the load does not demand a high current, however, then excessive peak current causes significant inefficiency in the system. For optimum efficiency, the peak current of the inductor is adaptively adjusted proportional to the load current.

In the illustrated embodiment, the adaptive current limiter 316 adaptively adjusts the adaptive current limit voltage VACL to improve efficiency. The adaptive current limiter 316 adjusts VACL to provide higher peak current proportional to the output current IO as it is demanded by the load and then reduces it to a predetermined minimum value when the load current is lower. As shown, the adaptive current limiter 316 receives the PC signal and VREF and provides VACL. In the illustrated embodiment, the adaptive current limiter 316 uses VO as a source voltage relative to GND and also receives the SLEEP signal for additional power savings as further described herein.

Figure 4:
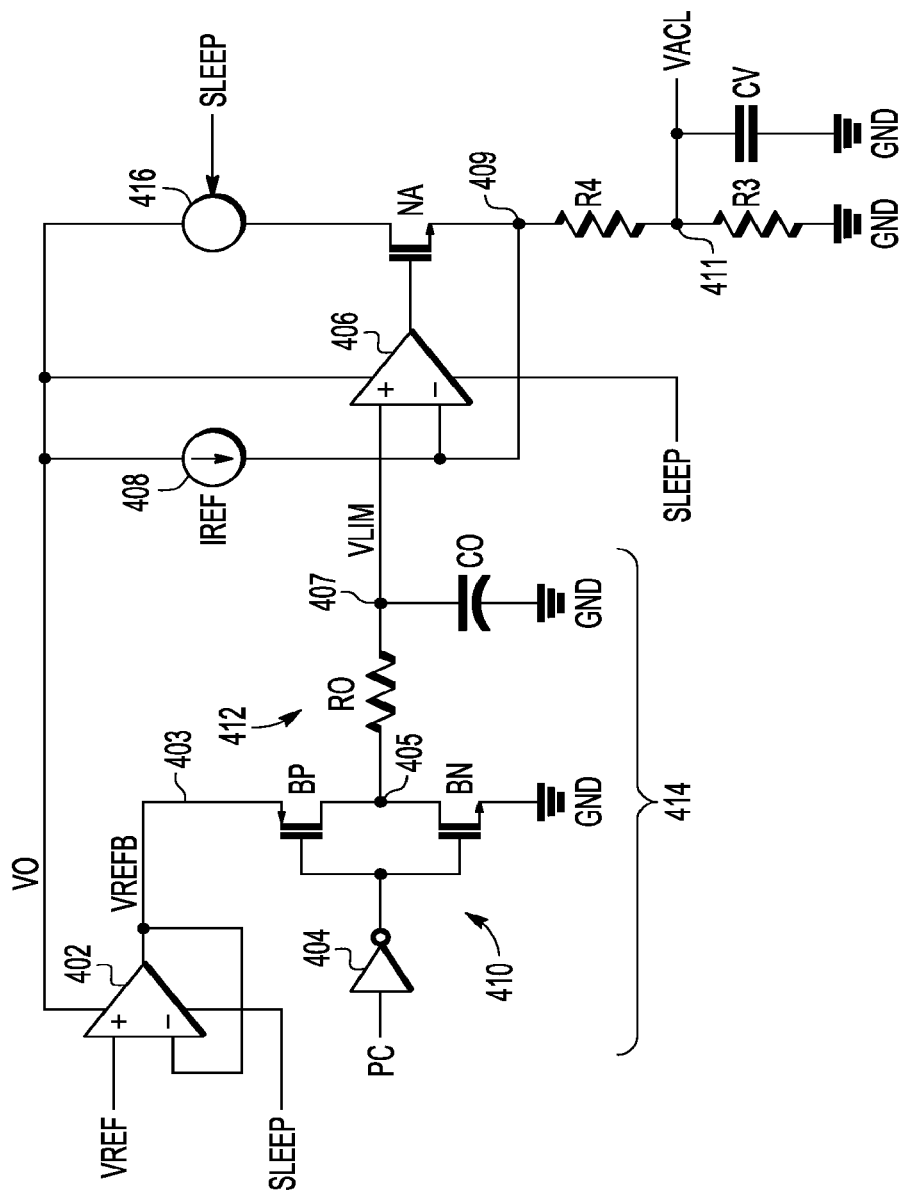
FIG. 4 is a simplified schematic diagram of the adaptive current limiter implemented according to an exemplary embodiment of the present invention.

FIG. 4 is a simplified schematic diagram of the adaptive current limiter 316 implemented according to an exemplary embodiment of the present invention. VREF is provided to the positive input of an amplifier 402 configured as a buffer amplifier, having its negative input and output coupled together at a node 403 developing a buffered reference voltage VREFB. The PC signal generated by the modulator 302 is provided to the input of an inverter 404, having its output coupled to the gates of a P-type transistor BP and an N-type transistor BN. BP and BN may be MOS transistors or FETs or the like and are coupled in an inverter configuration between node 403 and GND. As shown, the source of BP is coupled to node 403 and its drain is coupled to a node 405. The drain of BN is coupled to node 405 and its source is coupled to GND. The inverter 404, BP and BN collectively form a balanced non-inverting digital buffer 410.

Node 405 is further coupled to a resistor-capacitor (RC) network including a resistor RO and a capacitor CO. RO and CO are coupled as an integrator 412 to effectively integrate the toggling voltage of node 405 to develop a limit voltage VLIM on a node 407. As shown, RO is coupled between nodes 405 and 407 and CO is coupled between node 407 and GND. The digital buffer 410 and the integrator 412 collectively form a conversion network 414 which converts VREF to VLIM based on the duty cycle of PC.

Node 407 developing VLIM is coupled to the positive input of another amplifier 406. A current source 408 is coupled between VO and the negative input of the amplifier 406, which is further coupled to a node 409. The current source 408 sources a reference current IREF to node 409. The output of the amplifier 406 is coupled to the gate of an N-type transistor NA, which has a drain coupled to VO and a source coupled to node 409. A resistor R4 is coupled between node 409 and another node 411 which develops the voltage VACL. Another resistor R3 and a filter capacitor CV are coupled in parallel between node 411 and GND.

VO is provided as a source voltage to amplifiers 402 and 406, which have control inputs receiving the SLEEP signal. In one embodiment, the power controller 314 negates SLEEP during normal operation to activate or otherwise enable the amplifiers 402 and 406. The power controller 314 asserts SLEEP to de-activate or disable the amplifiers 402 and 406 to conserve energy. A switch 416 may be provided and controlled by the SLEEP signal to de-couple NA from VO during the sleep mode. During the sleep mode, the capacitor CV maintains the voltage of VACL.

When PC goes high, node 405 is asserted high to the voltage level of VREF, since VREFB is effectively a buffered version of VREF. When PC goes low, node 405 is pulled low to GND. In this manner, as PC toggles between logic high and low values, node 405 toggles between VREF and GND. VREF may be a relatively accurate voltage level such as developed by a bandgap circuit or the like.

As shown by equation (5), the load current IO is proportional to the square of the duty cycle D. Also, as shown by equation (4), the inductor peak current $IL_{PEAK}$ is proportional to the load current IO, in which the inductor peak current is also proportional to duty cycle D of the PC signal. The digital buffer 410 develops an accurate version of the PC signal, in which node 405 toggles between VREF and GND. The version of the PC signal on node 405 is integrated by the integrator 412 to develop the limit voltage VLIM, which is then used to set the peak current limit determined by VACL. In the illustrated embodiment, VLIM is about equal to the duty cycle D multiplied by VREF, or VLIM=D·VREF (in which a dot "·" is used herein to denote multiplication).

VLIM is fed to an amplifier arrangement with a fixed minimum output voltage established by applying IREF to a summing point of the amplifier 406 at node 409. In one embodiment, IREF is a bandgap derived current source and the resistors R3 and R4 are resistors of the same type employed within the same bandgap circuit developing IREF. The VACL voltage is used to set the peak inductor current of the switching regulator 108. In this manner, the adaptive current limiter 316 operates in feed forward mode in which it uses the PC signal to sense the output load of the switching regulator 108 to adjust the peak current level of the inductor current IL. Thus, the current limit is adjusted at higher load levels to be slightly higher than a minimum level needed to supply the load current. The closed loop gain of this amplifier arrangement is given by the following equation (9):

$$G = \frac{R3}{R3 + R4} \qquad (9)$$

Ignoring the contribution of IREF, when the duty cycle is above a minimum level, VACL is determined by the following equation (10):

$$VACL = VREF \cdot D \frac{R3}{R3 + R4} \qquad (10)$$

IREF flows through R3 to maintain VACL at a minimum value $VACL_{MIN}$, which is determined as $VACL_{MIN}$=IREF·R3. Thus, equation (10) determines the value of VACL above $VACL_{MIN}$, and otherwise VACL is $VACL_{MIN}$.

Figure 5:
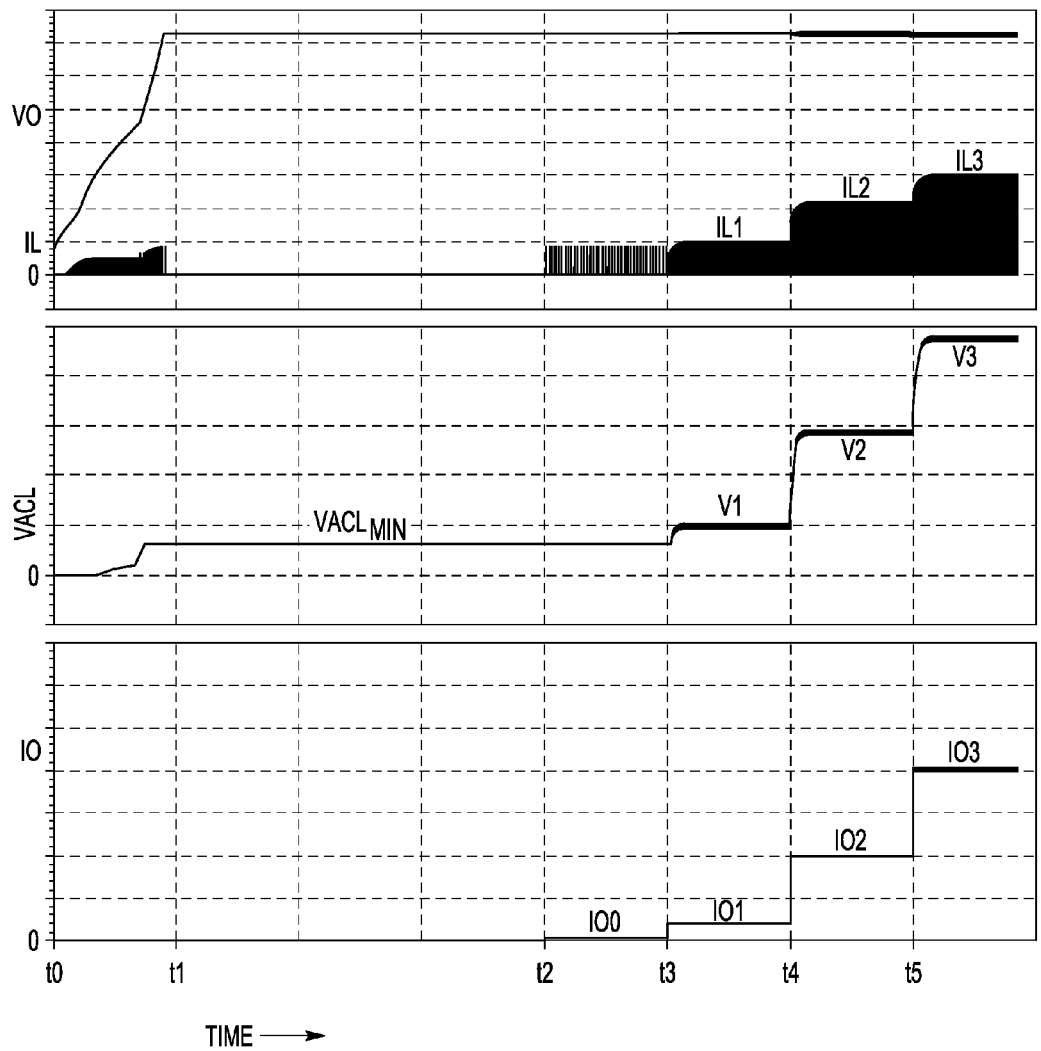
FIG. 5 is a plot showing a simulation of the switching regulator of FIG. 1 plotting normalized versions of various signals of the switching regulator versus time.

FIG. 5 is a plot showing a simulation of the switching regulator 108 plotting normalized versions of output voltage VO, inductor current IL, adaptive current limit voltage VACL and load current IO versus time. Between an initial time t0 and a next time t1, the switching regulator 108 is powered up. After VO rises to a minimum level, the inductor current is switched to raise the output voltage VO to its regulated voltage level. VACL increases to its minimum level $VACL_{MIN}$ determined by IREF·R3 as previously described. The load current IO remains at a minimum level. After time t1 up to a subsequent time t2, the signals remain substantially constant.

At subsequent time t2, the load current increases slightly to an increased level IO0 and the inductor current IL toggles in response at a relatively low duty cycle. The load increase is not sufficient to substantially increase VACL since D remains sufficiently low, so that VACL remains at $VACL_{MIN}$.

At subsequent time t3, the load increases to a level IO1 causing VACL to increase above $VACL_{MIN}$ to a voltage level V1. The inductor current toggles at a higher duty cycle up to a first peak level IL1 which corresponds with the increase of VACL to V1. The ripple voltage on VO increases slightly but it remains within regulation range. Although IL is shown as a solid area in FIG. 5 after time t3, it is understood that IL toggles between a low value (e.g., 0) and the indicated peak level (e.g., IL1, IL2, IL3, etc.). At subsequent time t4, the load increases to a level IO2 greater than IO1 causing VACL to increase further to a voltage level V2 which is greater than V1. The inductor current toggles at a higher duty cycle up to a second peak level IL2 which corresponds with the increase of VACL to V2. The ripple voltage on VO increases further but it remains within regulation range. At subsequent time t5, the load increases to a level IO3 greater than IO2 causing VACL to increase further to a voltage level V3 which is greater than V2. The inductor current toggles at a higher duty cycle up to a third peak level IL3 which corresponds with the increase of VACL to V3. The ripple voltage on VO increases further but still remains within regulation range.

In summary, as the load is increased above a certain level, the peak level of the inductor current is allowed to increase based on a corresponding increase of VACL. As further described herein, when the load increases, VACL is increased to enable the peak level of the inductor current to be increased to handle the higher load. Although efficiency is reduced, the regulator is able to handle a higher load level. Furthermore, when the load decreases, VACL decreases accordingly to increase the efficiency of the regulator at lighter load levels.

Figure 6:
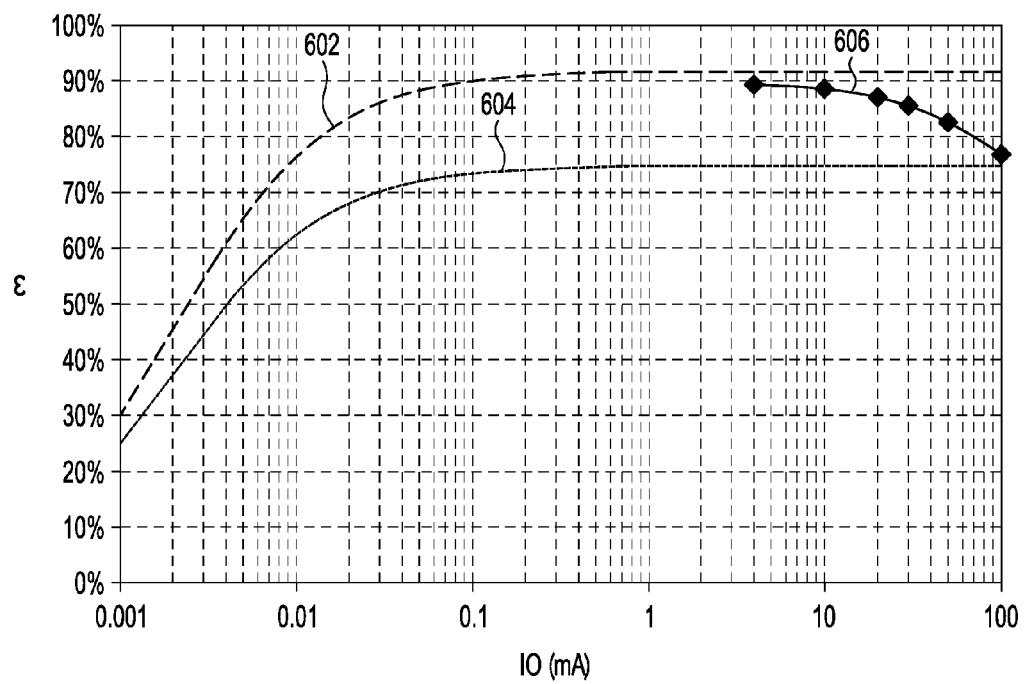
FIG. 6 is a plot showing efficiency versus output current of an exemplary configuration of the an the switching regulator of FIG. 1.

FIG. 6 is a plot showing efficiency ε versus output current measured in milliamps (mA) of an exemplary embodiment of the switching regulator 108. The particular output current range is arbitrary and may be different for different embodiments. A first trace 602 (dashed line) depicts the switching regulator 108 with the adaptive current limiter 316 configured at fixed value of VACL to limit the peak inductor current to about 240 mA. In this case, a maximum efficiency of 91.7% is obtained. The roll-off of the efficiency at very light output loads (below 0.1 mA) is due to the quiescent current of the switching regulator 108. The maximum output current of the regulator 108 is approximately 44 mA, which is insufficient for loads that require 100 units or more.

A second trace 604 (dotted line) depicts the switching regulator 108 with the adaptive current limiter 316 configured at fixed value of VACL to limit the peak inductor current to about 750 units, which enables the switching regulator 108 to deliver up to about 112 units to a load. The maximum efficiency for this case is only about 75%. Thus, although lower efficiency is achieved, a higher output load level is also provided.

A third trace 606 depicts the switching regulator 108 with the adaptive current limiter 316 configured as described herein with adaptively adjusted VACL based on PC. In this case, the current limit is dynamically adjusted in response to PC duty cycle, which is responsive to output load current. In this case, VACL is increased (e.g., up to 750 mA) to enable over 100 mA of load current to be delivered to a load at reduced efficiency. At lighter loads below 100 mA, the adaptive current limiter 316 reduces VACL accordingly to reduce the peak inductor current level to increase efficiency. As shown, when the output current drops to about 4 mA, VACL is decreased to a minimum level (e.g., about 240 mA) to increase efficiency up to over 90% at low load levels. In this manner, the adaptive current limiter 316 is configured to increase efficiency at lighter load levels while enabling the switching regulator 108 to service heavier loads.

It is appreciated that an adaptive current limiter as described herein increases the current limit of a switching regulator to service higher load levels, and decreases the current limit at lower load levels to improve overall efficiency. In one embodiment, the adaptive current limiter includes a conversion network and an amplifier network. The conversion network is configured to provide a limit value based on applying a duty cycle of the pulse control signal to a reference value. The amplifier network is configured to provide an adaptive current limit signal based on the limit value, in which adaptive current limit signal is configured to be used by the switching regulator to limit peak current through the inductor. The amplifier network may further include a fixed reference current or the like to establish a minimum peak current level at lighter load levels.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. An adaptive current limiter for a switching regulator, wherein the switching regulator develops a pulse control signal and adjusts a duty cycle of the pulse control signal to control switching of current through an inductor to convert an input voltage to an output voltage, the adaptive current limiter comprising:

a conversion network which is configured to provide a limit value based on applying the duty cycle of the pulse control signal to a reference value; and an amplifier network which is configured to provide an adaptive current limit signal using said limit value, wherein said adaptive current limit signal is used by the switching regulator to limit peak current through the inductor.

2. The adaptive current limiter of claim 1, wherein said conversion network comprises:

a digital buffer which uses said pulse control signal to toggle voltage of a first node between reference voltage limits; and an integrator which integrates voltage of said first node to provide said limit value as a limit voltage.

3. The adaptive current limiter of claim 2, wherein said digital buffer comprises:

an inverter having an input receiving said pulse control signal and having an output; and a inverter comprising complementary devices having an input coupled to said output of said inverter and having an output coupled to said first node.

4. The adaptive current limiter of claim 2, wherein said digital buffer comprises:

an inverter having an input receiving said pulse control signal and having an output; and a first transistor of a first conductivity type having current terminals coupled between a reference node and said first node and having a control terminal coupled to said output of said inverter; and a second transistor of a second conductivity type having current terminals coupled between ground and said first node and having a control terminal coupled to said output of said inverter.

5. The adaptive current limiter of claim 2, wherein said integrator comprises a resistor coupled between said first node and a second node developing said limit voltage and a capacitor coupled between said second node and ground.

6. The adaptive current limiter of claim 1, wherein said amplifier network comprises:

an operational amplifier having a positive input receiving said limit value as a limit voltage, having a negative input coupled to a second node, and having an output;

a transistor having a control terminal coupled to said output of said operational amplifier, having a first current terminal coupled to a source voltage and having a second current terminal coupled to said second node; and a voltage divider coupled between said second node and a reference node and having an intermediate node developing said adaptive current limit signal as an adaptive current limit voltage.

7. The adaptive current limiter of claim 6, further comprising a current source providing a fixed reference current to said second node to establish a minimum level of said adaptive current limit voltage.

8. A switching regulator, comprising:

a switch network that is configured to switch current through an inductor using a pulse control signal to convert an input voltage to an output voltage;

a current sense network configured to develop a current sense signal indicative of current through said inductor;

a voltage sense network configured to develop a voltage sense signal indicative of said output voltage;

a first comparator configured to compare said current sense signal with an adaptive current limit signal to develop a first timing signal used for limiting a peak current through said inductor;

a second comparator configured to compare said voltage sense signal with a predetermined nominal value to develop a second timing signal;

a modulator configured to develop said pulse control signal using said first and second timing signals; and an adaptive current limiter which provides said adaptive current limit signal proportional to a duty cycle of said pulse control signal indicative of an output load of the switching regulator.

9. The switching regulator of claim 8, wherein said adaptive current limiter comprises:

a conversion network which multiplies a reference voltage by a duty cycle of said pulse control signal to develop a limit voltage; and an amplifier network which is configured to develop said adaptive current limit signal based on said limit voltage.

10. The switching regulator of claim 9, wherein said conversion network comprises:

a digital buffer which toggles voltage of a first node between first and second reference voltage levels using the pulse control signal; and an integrator which integrates voltage of said first node to provide said limit voltage.

11. The switching regulator of claim 10, wherein said digital buffer comprises:

an inverter having an input receiving said pulse control signal and having an output;

a first transistor of a first conductivity type having current terminals coupled between a reference node and said first node and having a control terminal coupled to said output of said inverter; and a second transistor of a second conductivity type having current terminals coupled between ground and said first node and having a control terminal coupled to said output of said inverter.

12. The switching regulator of claim 9, wherein said amplifier network comprises:

an operational amplifier having a positive input receiving said limit voltage, having a negative input coupled to a second node and having an output;

a transistor having a control terminal coupled to said output of said operational amplifier, having a first current terminal coupled to a source voltage and having a second current terminal coupled to said second node; and a voltage divider coupled between said second node and ground having an intermediate node developing said adaptive current limit signal as an adaptive current limit voltage.

13. The switching regulator of claim 12, further comprising a current source providing a fixed reference current to said second node to establish a minimum level of said adaptive current limit voltage.

14. The switching regulator of claim 8, wherein said switch network, said inductor and said modulator are configured to operate as a boost converter.

15. The switching regulator of claim 8, wherein said modulator asserts said pulse control signal to a first level when said output voltage reaches a predetermined minimum level and asserts said pulse control signal to a second level when current through said inductor reaches a peak level determined by said adaptive current limit signal.

16. The switching regulator of claim 8, wherein said modulator is configured to operate the switching regulator in discontinuous conduction mode.

17. A method of adaptively adjusting peak current through an inductor of a switching regulator which develops a pulse control signal and adjusts a duty cycle of the pulse control signal to control switching of current through the inductor to convert an input voltage to an output voltage, the method comprising:

applying the pulse control signal to a reference value to provide a limit value proportionate to output load based on the duty cycle of the pulse control signal; and developing an adaptive current limit signal based on the limit value for use by the switching regulator to limit peak current through the inductor.

18. The method of claim 17, wherein said applying comprises:

toggling a node between reference voltage limits using the pulse control signal; and integrating voltage of the node.

19. The method of claim 18, wherein said integrating comprises applying the voltage of the node to a resistor-capacitor network.

20. The method of claim 17, wherein said developing comprises amplifying the limit value by a closed loop gain value.

21. The method of claim 17, wherein said developing comprises limiting the adaptive current limit signal to be at or above a predetermined minimum level.

\* \* \* \* \*